UNITED STATES PATENT OFFICE.

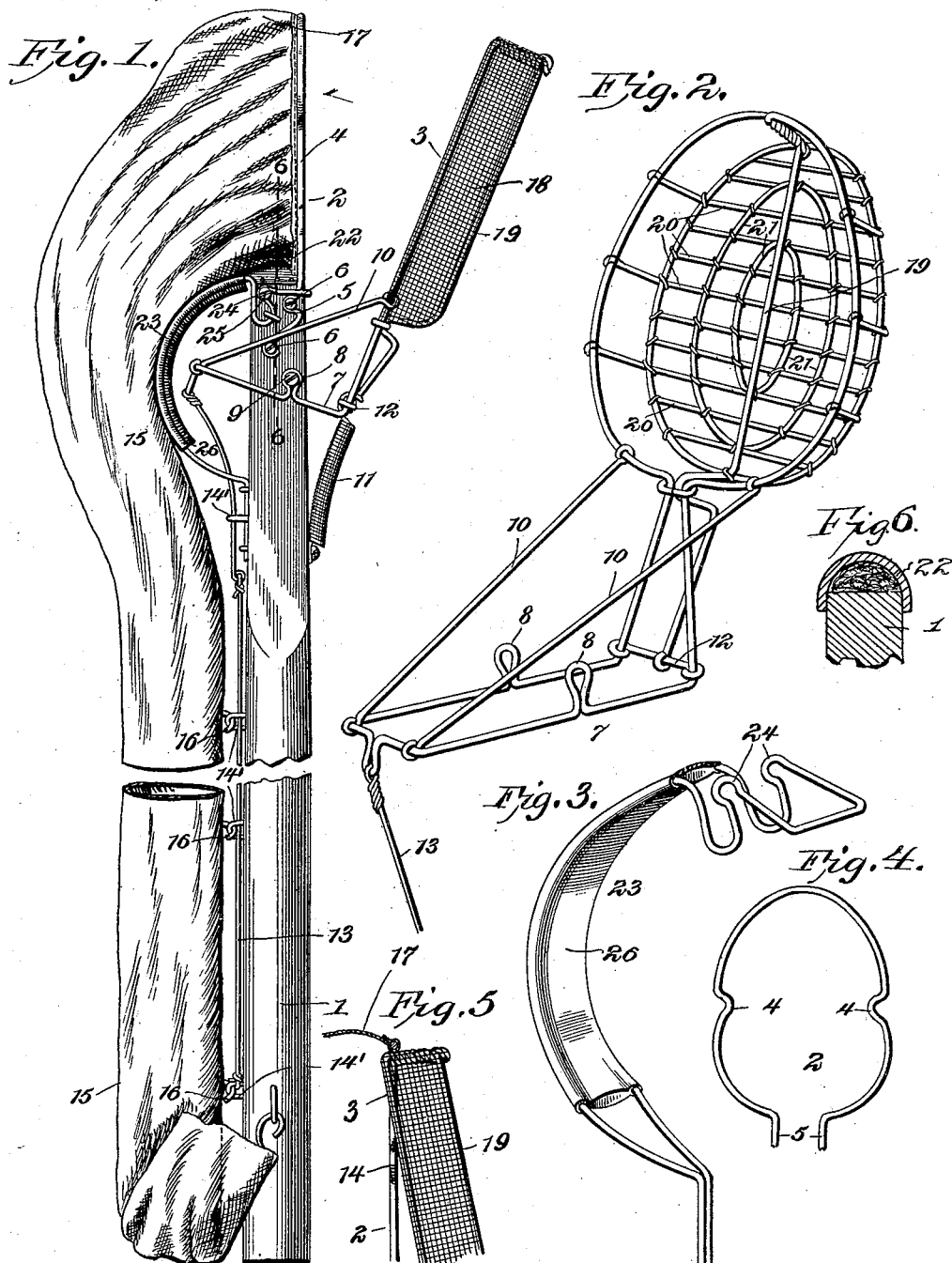

JOHN C. WOOD, OF VANCEBURG, KENTUCKY, ASSIGNOR OF ONE-TENTH TO ROBERT D. WILSON, OF SAME PLACE.

FRUIT-PICKER.

SPECIFICATION forming part of Letters Patent No. 635,990, dated October 31, 1899.

Application filed August 9, 1899. Serial No. 726,719. (No model.)

*To all whom it may concern:*

Be it known that I, JOHN C. WOOD, a citizen of the United States, residing at Vanceburg, in the county of Lewis and State of Kentucky, have invented a new and useful Fruit-Picker, of which the following is a specification.

My invention relates to fruit-pickers, and more particularly to that class of devices which are manipulated by an operator standing upon the ground and reaching up into the trees with one end of the picker and letting the fruit pass down through a suitable conduit by gravity.

The object of the invention is to provide a device of this kind which can be used upon different varieties of fruit—as apples, peaches, pears, oranges, lemons, cherries, and the like—with equal facility; and it consists in the combination and improved construction of parts of the same, as will be hereinafter more fully set forth.

Referring to the accompanying drawings, in which the same reference-numeral indicates a corresponding part in the view in which it occurs, Figure 1 is a side elevation of the fruit-picker embodying my invention. Figs. 2 and 3 are detail views, the covering for the pad being broken away in Fig. 3. Fig. 4 is a front view of the rigid jaw, and Fig. 5 is a broken sectional view of the upper portion of the two jaws. Fig. 6 is a detail transverse sectional view taken on the line 6 6 of Fig. 1.

Referring more particularly to the drawings, 1 indicates the handle, which may be of any suitable length and size to enable the operator to stand upon the ground or other suitable support and reach the fruit which it is desired to pick. The upper end of the handle is provided with two jaws 2 and 3, one of which is rigidly secured to the upper end of the handle and the other one is pivotally secured below the other jaw in such relation thereto that it may be moved toward and from the fixed jaw, so as to clamp the fruit therebetween and remove it from the tree by pulling or pushing upon the handle, as is most convenient. These jaws are preferably formed of wire and are substantially oval or egg shaped, the point of one of them being slightly smaller and adapted to pass into the other one, so as to prevent the fruit from spreading them apart and slipping out when the handle is drawn downward. The larger jaw, which is in this instance the rigid one, is provided with suitable stops—as, for instance, inward bends or crooks of the wire 4—against which the other jaw engages and is prevented from being drawn in too far. The free ends of the wire forming the rigid jaw are provided with bends or eye portions 5, by means of which they are secured to the sides of the handle by suitable pins or screws 6.

The movable jaw is provided with an angular extension 7, the intermediate portion of one arm of which is provided with eyes 8, by means of which the jaw is secured to the side of the handle a suitable distance below the fixed jaw by means of the pins or screws 9. This formation of the extension throws the point of the movable jaw within the point of the upper jaw, as above described, without causing the lower end to strike against the fixed jaw. Suitable braces 10 extend from the free end of the extension 7 to the lower end of the jaw to give it the necessary strength to hold the jaws firmly together after they have been closed to remove the fruit.

The movable jaw is caused to remain normally open or away from the fixed jaw by means of a spring 11, which is secured to a cross-bar 12 at the angular portion of the extension.

When it is desired to close the jaws, the operator draws upon a string or cord 13, the upper end of which is provided with a wire and secured to the free end of the extension 7, and the intermediate portion is preferably passed through staples 14 upon the handle. By securing the lower end of the cord to the lower staple, so that it will just permit of the jaw being opened to its fullest extent, all unnecessary slack is taken out of the cord when the jaw is opened and the cord is out of the way of the operator.

Secured to the fixed jaw is a conduit 15 of sufficient size to permit of the passage of the largest fruit that may be gathered. The conduit is secured to the handle by means of hooks 16, which engage with the staples 14, and the lower end extends beyond the lower end of the handle such a distance that it may be folded upon itself and secured by means of the hook at that end, thereby closing the conduit against the escape of the fruit. The upper end of the conduit extends slightly above the point of the jaw, as shown at 17, to offer sufficient room for the fruit to permit of the jaw engaging with the stem of the fruit and pulling it from the tree.

The movable jaw is provided with a suitable netting or covering 18, which is preferably held outward therefrom by means of a rib 19. Instead of the netting the movable jaw may be provided with a series of transverse ribs 20 the ends of a portion of which are secured to the loop and the intermediate portions of all of them are secured to the brace and also to a series of intermediate or auxiliary loops 21. The rib 19 also acts as a brace for the jaw and extends from the point to the base thereof and also to the cross-bar 12, to which it is secured in a line with the spring 11.

To avoid the possibility of the fruit falling upon the upper end of the handle and being bruised thereby, a cushion 22 is placed directly upon the end of the handle and the curved guard 23 projects outwardly therefrom and around the free end of the extension 7. The guard is preferably formed from a band or wire, and the head or upper portion is provided with suitable eyes 24, by means of which it is secured to the top of the handle immediately adjacent to the fixed jaw by pins or screws 25. A covering 26 extends from the cushion out over the curved portion of the guard to a point below the free end of the extension 7 to prevent small fruit, such as cherries, from lodging in between the wires as they pass down the conduit. The lower end of the guard is constricted or narrowed and is secured to the handle in any suitable manner. The bulged portion of the guard is just far enough from the handle to permit of the movement of the free end of the extension as the device is operated.

In operating my device the fixed jaw is placed beyond the fruit to be removed and the movable jaw drawn inward as closely as possible by means of the cord, which extends down the side of the handle. As soon as the fruit has been secured the handle is drawn downward or otherwise moved so as to break the connection between the stem of the fruit and the tree, when gravity will do the rest. In its first descent the fruit will strike upon the cushion or the guard and be slightly checked, and from there it will start on its course along the conduit. With a long conduit and heavy fruit at the extreme lower end it may be desirable for the operator to grasp the conduit between his hand and the handle to break the fall of the fruit just before it reaches the fruit in the lower end of the conduit. By releasing the conduit from the grasp the fruit is permitted to pass down upon the other fruit without danger of its being bruised.

From the foregoing it is evident that the operator can take any portion of the fruit upon a tree without disturbing the remaining portion, and as soon as a desirable quantity has been placed in the conduit it may be removed by simply unhooking the lower end of the conduit and letting the fruit pass out through the open end thereof.

Having described my invention, I claim—

1. In a fruit-picker, the combination, with a handle, the upper end of which is provided with a cushion and a rigid jaw, of a guard extending from the cushion, a spring-actuated jaw pivotally secured to the handle below the rigid jaw and provided with an extension, the free end of which is adjacent to the guard, a conduit from the rigid jaw, and a cord from the free end of the extension for operating the movable jaw.

2. In a fruit-picker, the combination, with a handle, of a jaw rigidly secured to the upper end thereof, a curved guard extending outwardly from the top of the handle adjacent to the jaw, a jaw movable toward and from the rigid jaw, the lower end of which is provided with an angular extension, the intermediate portion of one arm of the extension being pivotally secured to the handle, and the free end lying adjacent to the guard, a spring secured to the angled portion of the extension at one end and to the handle at the other end to normally hold said jaw away from the rigid jaw, and a cord from the free end of the extension for operating the movable jaw.

3. In a fruit-picker, the combination, with a handle, of a wire loop, the free ends of which extend along the sides of the handle and are provided with eyes, pins through the eyes, a second loop movable toward and from said first-named loop, a portion of which is formed into an angular extension, the intermediate portion of one arm of the extension being provided with eyes, pins through said eyes, braces from the free end of the extension to said second loop, a spring for normally holding said second loop away from the other loop, a cord from the free end of the extension, and a conduit from the first-named loop.

4. In a fruit-picker, the combination, with a handle, of a rigid and a movable loop secured to the upper end thereof, said loops being substantially oval and a point of the movable loop being adapted to pass into the point of the fixed loop, and having its lower end provided with an angular extension, a cross-bar in the extension, a brace extending from the point of the movable loop to the base thereof and to the cross-bar, a spring secured to the cross-bar and to the handle in line with said brace, a covering for said movable loop, a conduit from the rigid loop, and a guard over the free end of the extension of the movable loop.

5. In a fruit-picker, the combination, with a handle, the upper end of which is provided with a cushion, of a rigid and a movable jaw secured to the upper end of the handle, a curved wire guard secured to the handle, the head of which fits the upper end of the handle and is provided with eyes for securing it in position adjacent to the cushion, a covering for the guard and the cushion, and means for operating the movable jaw.

In testimony that I claim the foregoing as my own I have hereto affixed my signature in the presence of two witnesses.

JOHN C. WOOD.

Witnesses:
W. E. DARRAGH,
J. NOEL JOHNSON.